United States Patent [19]

Hackel

[11] Patent Number: 4,780,878
[45] Date of Patent: Oct. 25, 1988

[54] TECHNIQUES FOR REDUCING AND/OR ELIMINATING SECONDARY MODES IN A DYE LASER OSCILLATOR

[75] Inventor: Richard P. Hackel, Livermore, Calif.

[73] Assignee: The United States of America as represented by the United States Department of Energy, Washington, D.C.

[21] Appl. No.: 909,530

[22] Filed: Sep. 22, 1986

[51] Int. Cl.⁴ ............................ H01S 3/10; H01S 3/20
[52] U.S. Cl. ........................................... 372/9; 372/53; 372/54
[58] Field of Search ................................ 372/9, 53, 54

[56] References Cited

U.S. PATENT DOCUMENTS

| | | | |
|---|---|---|---|
| 3,478,277 | 11/1969 | Giordmaine et al. | 331/94.5 |
| 3,868,590 | 2/1975 | Itzkan et al. | 331/94.5 |
| 4,016,504 | 4/1977 | Klauminzer | 372/9 |

FOREIGN PATENT DOCUMENTS

| | | |
|---|---|---|
| 1137367 | 6/1966 | United Kingdom . |
| 1055398 | 1/1967 | United Kingdom . |
| 1096595 | 12/1967 | United Kingdom . |
| 2034104 | 5/1980 | United Kingdom ................ 372/53 |

OTHER PUBLICATIONS

Moore et al., "Power-scaling effects in dye lasers under high power laser excitation", J. Appl. Phys, 49(1), Jan. 1978, pp. 47-60.

Hansch, "Repetitively Pulsed Tunable Dye Laser for High Resolution Spectroseupy", Applied Optics, vol. 11, No. 4, Apr. 1972, pp. 895-898.

*Primary Examiner*—William L. Sikes
*Assistant Examiner*—Georgia Y. Epps
*Attorney, Agent, or Firm*—P. Martin Simpson, Jr.; L. E. Carnahan; Judson R. Hightower

[57] ABSTRACT

A dye laser master oscillator is disclosed herein. This oscillator is intended to provide a single mode output, that is, a primary beam of light of a specific wavelength, but also has the tendency to provide secondary modes, that is, secondary beams of light at different wavelengths and slightly off-axis with respect to the primary beam as a result of grazing incident reflections within the dye cell forming part of the master oscillator. Also disclosed herein are a number of different techniques for reducing or eliminating these secondary modes.

12 Claims, 2 Drawing Sheets

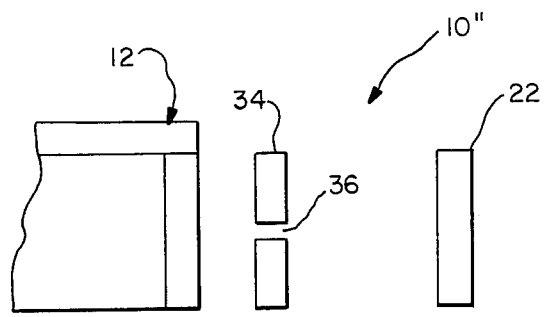
FIG. —4
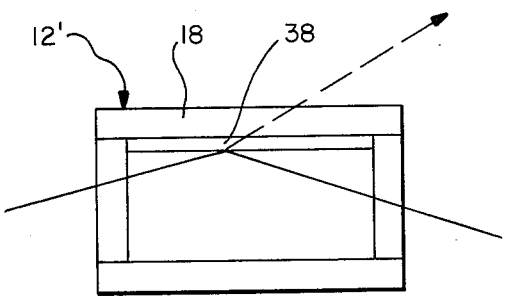
FIG. —5
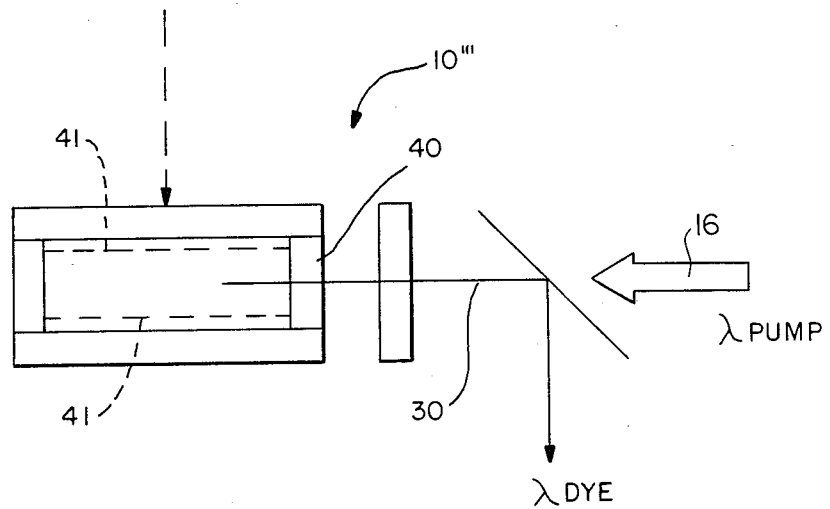
FIG. —6

TECHNIQUES FOR REDUCING AND/OR ELIMINATING SECONDARY MODES IN A DYE LASER OSCILLATOR

The United States Government has rights in this invention pursuant to Contract No. W-7405-ENG-48 between the United States Department of Energy and University of California for the operation of the Lawrence Livermore National Laboratory.

BACKGROUND OF THE INVENTION

The present invention relates generally to dye laser oscillators, specifically one designed to operate in a single frequency mode only, and more particularly to different techniques for reducing and/or eliminating the presence of secondary operating modes at the output of the master oscillator.

A dye master oscillator of the type to which the present invention is directed is illustrated diagrammatically in FIG. 1 by the reference numeral 10. This dye laser oscillator includes a dye cell 12 defining an inner lasing chamber 14 through which a continuous stream of dye passes (into the paper). At the same time, a pump beam generally indicated by the arrow 16 is directed into the lasing chamber through a cooperating window 18 for pumping the dye as the latter passes through the lasing chamber. While not shown, a second pump beam can be directed into the lasing chamber through opposite window 20.

In addition to the dye cell, the continuous stream of dye and the pump beam or beams, the over-all dye laser master oscillator 10 is shown including an output coupler or end mirror 22, a beam expander 24, an etalon 26, and a grating 28 supported in the positions illustrated in FIG. 1 by suitable means (not shown). All of these components making up the oscillator cooperate with one another in a known manner for producing at the output of the oscillator a primary light beam 30 at a specific wavelength $\lambda_p$ along a specific primary optical axis which defines the positions of the dye cell, end mirror, beam expander, etalon, and grating.

The dye laser master oscillator just described is intended for use in a particular process, the details of which are not pertinent to the present invention. It suffices merely to say that it is highly desirable to operate the oscillator in a single frequency mode, that is, so that beam 30 displays only primary wavelength $\lambda_p$. Heretofore, so long as the oscillator has been operated at a relatively low peak power, the presence of a secondary operating mode, that is, output light having a different or secondary wavelength $\lambda_s$, has not been significant. However, more recently, the oscillator has been operated at higher powers, for example 1 Kw and the presence of secondary modes has become more significant and less tolerable. It was thought that the presence of these secondary modes was the direct result of operating the oscillator at higher power. Specifically, it was thought that this increased the gain across the spectrum and decreased the threshold for lasing and thus caused the dye being pumped to lase simultaneously at multiple frequencies. Therefore, it was concluded that the secondary operating modes would have to be tolerated if the oscillator was to be operated at higher power levels.

In view of the foregoing, it is a primary object of the present invention to reduce and/or entirely eliminate secondary modes in a dye laser master oscillator of the general type described above.

Another object of the present invention is to reduce and/or entirely eliminate secondary operating modes in different uncomplicated ways.

As stated previously, it has been thought heretofore that the presence of secondary operating modes was the direct result of increasing the power output level of the oscillator which for purposes of discussion will be referred to as the "power theory". Since then, applicant has made certain observations and from these observations concluded that the primary cause of secondary modes is due to grazing incidence reflections within the dye cell forming part of the over-all oscillator. In reaching this conclusion, Applicant first observed that each and every secondary mode (e.g. secondary beam) is always at a longer wavelength $\lambda_s$ than the wavelength $\lambda_p$ of the primary mode (e.g. the primary beam). Secondly, applicant observed that the secondary modes were stronger off-axis relative to the primary mode, that is, that the secondary modes were spatially dependent. The original power theory does not account for these observations. If this power theory were accurate, the secondary modes would not be spatially dependent and they would not always occur at wavelengths longer than the wavelength of the primary mode. These contradictions ultimately led applicant to recognize the true reason for the secondary modes which, as stated, is the result of grazing incident reflections. This is diagrammatically illustrated in FIG. 1 and also in FIG. 2 which illustrates the dye cell 12 by itself.

Referring again to FIG. 1, it should be noted that primary beam 30 impinges grating 28 at a particular angle $\theta$. This angle determines the value of $\lambda_p$, the wavelength of primary beam 30. At the same time, a secondary beam is shown at 32 as it grazes off of the interface between window 18 and the dye within chamber 14 (hereinafter referred to as the "critical interface"). As a result, the secondary beam impinges the grating 28 at a different (always higher) angle $\theta'$ than the angle $\theta$ of primary beam 30. At the same time, the secondary beam exits the oscillator through end mirror 22 off-axis with respect to the primary axis of beam 30. Therefore, because angle $\theta'$ is always greater than angle $\theta$, the secondary beam will always have a wavelength $\lambda_s$ which is longer than the wavelength $\lambda_p$ of beam 30 and because the secondary beam exits the oscillator off-axis relative to the primary beam, it is spatially dependent and specifically it will always be stronger off-axis.

The foregoing has been a discussion of how the grating contributes to the wavelength of secondary modes resulting from grazing incident reflections as a result of the difference in angles $\theta$ and $\theta'$. It is to be understood that the etalon also contributes to the wavelength of secondary modes in a similar way. In either case, the over-all intensity of any given secondary mode is not only dependent upon the power level at which the oscillator is being operated but also on the difference between the index of refraction of window 18 (or 20) and the index of refraction of the dye medium within lasing chamber 14. This is best exemplified in FIG. 2. If the index of refraction of the glass window and the liquid solvent forming part of the dye medium are different then grazing incidence reflections will occur. This is because lasing takes place at or just within the critical interface. The actual amount of this light which is reflected (R) will depend upon the following equations:

$$R = \frac{\tan(\alpha - \alpha')}{\tan(\alpha + \alpha')} \quad (1)$$

$$n_g \sin\alpha' = n_s \sin\alpha \quad (2)$$

Where alpha ($\alpha$) is the angle of incidence of the secondary beam with glass window 18, alpha prime ($\alpha'$) is its angle of refraction, $n_g$ is the index of refraction of the glass and $n_s$ is the index of refraction of the solvent forming part of the dye. These equations (1) and (2) are for a steady state situation. In actuality, a large amount of dynamic behavior may be occurring which could modify this relationship.

The foregoing recognition that secondary modes are a result of grazing incidence reflections and the observation that they occur off-axis serve as a primary component of the present invention. Based on this recognition and observation it is possible to minimize and/or entirely eliminate secondary operating modes in uncomplicated and reliable ways. As will be seen hereinafter, this is accomplished in accordance with several embodiments of the present invention by acting on any secondary mode or modes present in a way which reduces their intensity at the output of the oscillator. In accordance with another embodiment, the oscillator is designed so that lasing cannot take place at or just within the critical interface of the dye cell and therefore grazing incidence reflections do not occur at all. These various embodiments will be discussed in more detail hereinafter in conjunction with the drawings.

BRIEF DESCRIPTION OF THE DRAWINGS

The accompanying drawings which are incorporated in and form part of this specification illustrate an embodiment of the invention and, together with the description, serve to explain the principles of the invention.

FIG. 4 illustrates part of the oscillator of FIG. 1 but modified in accordance with a second embodiment of the present invention for reducing the intensity of any secondary beams at the output of the oscillator;

FIG. 5 diagrammatically illustrates a part of the oscillator of FIG. 1 but modified in accordance with a third embodiment of the present invention for reducing the intensity of any secondary beam at the output of the oscillator; and FIG. 6 diagrammatically illustrates a part of the oscillator of FIG. 1 but modified in accordance with a fourth embodiment of the present invention for eliminating the production of secondary beams within the dye cell forming part of the over-all oscillator.

DETAILED DESCRIPTION OF THE PREFERRED EMBODIMENT

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Figure 1:
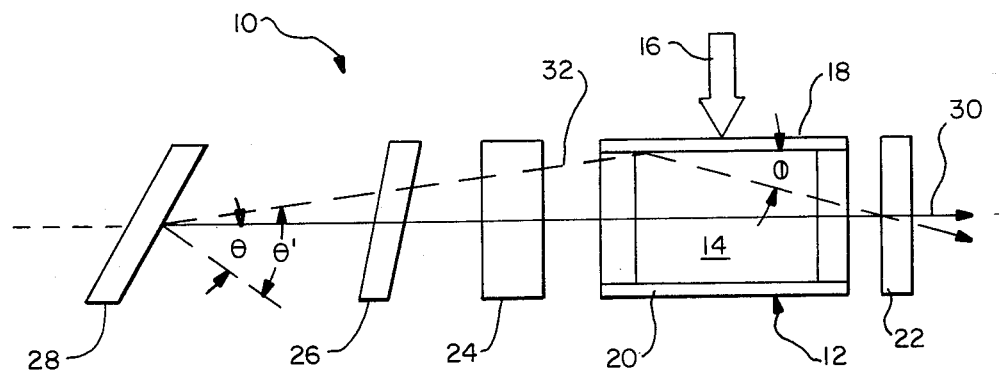
FIG. 1 diagrammatically illustrates a dye laser master oscillator designed in accordance with the prior art and depicting how secondary beams result from grazing incident reflections.
Figure 2:
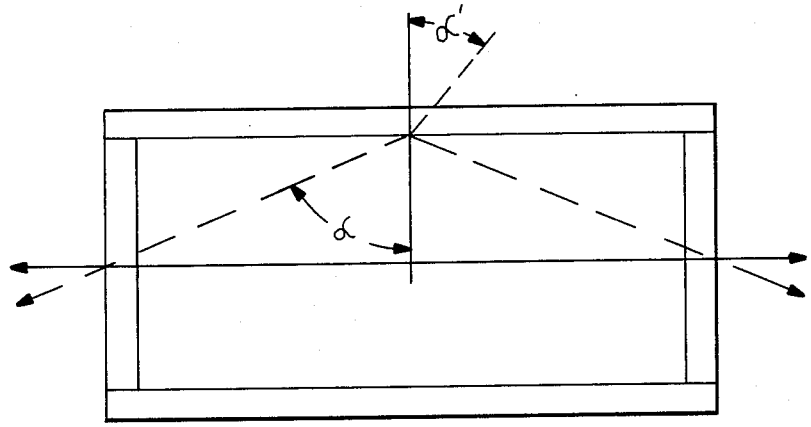
FIG. 2 is an enlarged diagrammatic illustration of a dye cell forming part of the oscillator of FIG. 1 and depicting the presence of a secondary beam.
Figure 3:
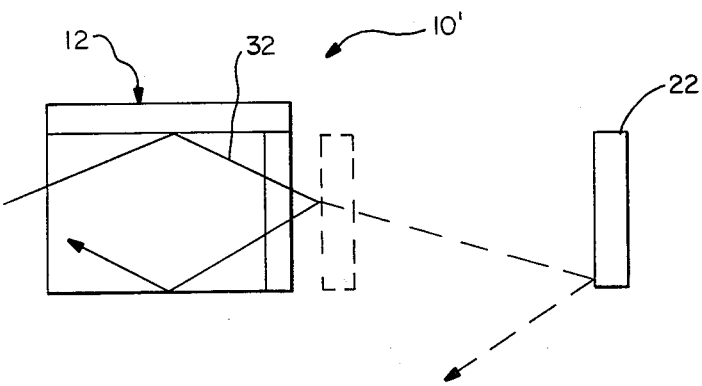
FIG. 3 diagrammatically illustrates part of the dye laser master oscillator of FIG. 1 but modified in accordance with one embodiment of the present invention for reducing the intensity of secondary beams at the output of the oscillator.

Turning now to the drawings, wherein like components are designated by like reference numerals throughout the various figures, attention is first directed to FIG. 3 since FIGS. 1 and 2 were discussed previously. FIG. 3 illustrates part of a dye laser master oscillator 10' which includes all of the components of oscillator 10 including specifically its dye cell 12 and end mirror 22, both of which are shown in FIG. 3. The only difference between oscillator 10' and oscillator 10 resides in the position of end mirror 22. As illustrated in FIGS. 1 and 3, the end mirror is closer to the dye cell in the oscillator 10 then it is in oscillator 10'. Since the secondary modes are slightly off-axis and since they rely on feedback arising from diffraction off of the end mirror (which has found to be the case), increasing the dye cell-end mirror spacing will selectively introduce more loss for these parasitic modes, thereby reducing their intensity. This is diagrammatically illustrated in FIG. 3. Note that with the end mirror in the dotted line position (corresponding to its FIG. 1 position), all of the light from secondary beam 32 which is not strong enough to pass through the end mirror is redirected back into the dye cell for further application. With the end mirror positioned further from the dye cell, as indicated by solid lines in FIG. 3, note that the light from the secondary beam not passing through the end mirror is redirected away from the dye cell, as indicated by the dotted arrow in FIG. 3. In an actual working embodiment the separation between end mirror 22 and the dye cell was increased by 500 percent (from 3 mm to 15 mm) which resulted in a 200 percent decrease in the intensity of all secondary beams.

Turning now to FIG. 4, part of another oscillator 10" is shown. This oscillator includes all of the components of oscillator 10 in the positions illustrated in FIG. 1, although for purposes of clarity the spacing between the output mirror 22 and dye cell 12 has been exaggerated. In accordance with this embodiment of the present invention, the over-all oscillator also includes a light opaque member 34 having a central aperture 36. This member is located between dye cell 12 and end mirror 22 with aperture 36 having minimal reflecting capability located on the axis of primary beam 30. Thus, preferably all but in any event a substantial part of the primary beam 30 is allowed to cross member 30 through aperture 36 and thereby reach the output of the oscillator. At the same time, the light opaque nature of member 34 blocks secondary beam 32 as well as any other secondary beams which are off-axis relative to the primary beam. This prevents some if not all of the secondary beam from reaching the output of the oscillator. In an actual working embodiment, member 34 having an aperture approximately 2 mm in diameter was positioned 4 mm from the dye cell. This resulted in a 50 percent decrease in the measured intensity of the secondary beams.

Turning now to FIG. 5, the dye cell forming part of still another oscillator is illustrated. This oscillator may be identical to oscillator 10, except for its dye cell which is illustrated at 12'. Moreover, the dye cell 12' may be identical to dye cell 12, with one exception. The inner surface of window 18 of dye cell 12' is covered with an anti-reflection coating 38. This coating is specifically selected to transmit high angle of incident light, on the order of 89.5° to 89.7°, that is, the light from secondary beams such as beam 32. This reduces the amount of secondary mode light which is actually reflected towards the output of the oscillator or back toward the beam expander. This in turn reduces the amount of actual secondary mode light at the output of the oscillator.

Returning to FIGS. 1 and 2, attention is directed to still another embodiment of the present invention. In accordance with this embodiment, the over-all oscillator may be identical to oscillator 10, with one exception. As indicated above, the index of refraction of the dye within dye cell 12 is typically different than the index of refraction of glass window 18. This, in turn, causes a portion of beam 32 to be internally reflected within the dye cell while a portion is refracted out of the cell through window 18, as illustrated in FIG. 1. However, in accordance with the present embodiment, the window 18 and the solvent making up the dye passing through the dye cell are selected so that they have as close to the same indexes of refraction as possible. The difference in the indexes is at most preferably no greater than $10^{-4}$. This is because of the extreme angle of incidence. Table 1 illustrates various reflection coefficients (r) for glasses and solvents of varying indexes of refraction assuming an 89.5 angle of incidence and a "P" polarization as an indication of relative reflectivity in the indices of refraction. The first listing is for ethanol (the solvent) and fused silica (the glass). Ethanol and fused silica are used for exemplary purposes only. There are other glasses and solvents which could be utilized.

TABLE 1

REFLECTION COEFFICIENT vs. REFRACTIVE INDEX
(at 89.5 angle of incidence and "P" polarization)

| $n$Solvent | $n$Glass | R (%) |
|---|---|---|
| 1.35 | 1.46 | 90.6 |
| 1.40 | 1.41 | 74.3 |
| 1.400 | 1.401 | 40.0 |
| 1.4000 | 1.4001 | 6.6 |

Turning now to FIG. 6, attention is directed to a way of entirely eliminating the secondary modes. FIG. 6 specifically illustrates a dye laser master oscillator 10''' which may be identical to the oscillator 10, with two exceptions. The oscillator 10''' is not pumped transversely but rather axially. In other words, the pump beam 16 does not enter the dye cell via window 18, as in oscillator 10, but rather through an end window 40 in the axial direction of the dye cell. To this end, a dichroic mirror is used to divert the dye beam 30 while allowing the pump beam to pass therethrough from the other side. Because of this longitudinal pumping, the lasing zone within the dye cell can be limited to the area between the dotted lines 41 in FIG. 6. Note that no lasing takes place at the critical interface, that is along the internal walls of the dye cell extending parallel with its longitudinal axis (outside the dotted lines 41). Therefore, there can be no grazing incidence reflections and thus no secondary beams.

The foregoing description of a preferred embodiment of the invention has been presented for purposes of illustration and description. It is not intended to exhaustive or to limit the invention to the precise form disclosed, and many modifications and variations are possible in light of the above teaching. The preferred embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. In a dye laser oscillator which is designed to produce at its output a primary light beam at one specific wavelength and along a specific primary axis by passing a continuous stream of dye through a dye cell and simultaneously directing a pump beam through a window in the dye cell to intercept the continuous stream of dye, but which also produces at the oscillator's output a secondary light beam at a different wavelength and slightly off-axis with respect to said primary axis as a result of grazing incidence reflections off the inner axially extending surfaces within the dye cell forming part of the master oscillator, the improvement comprising means entirely within said dye cell acting on said reflected secondary beam for reducing the number of grazing incidence reflections, thereby reducing the intensity of said reflected secondary beam without reducing or substantially reducing the intensity of said primary light beam.

2. The improvement according to claim 1 wherein said secondary beam intensity reducing means includes an anti-reflection coating on said inner axially extending surfaces of said dye cell for absorbing at least some of the light of said secondary beam.

3. The improvement according to claim 2 wherein said inner surfaces include a surface defining a window through which a pump beam is intended to pass for pumping the dye within said dye cell.

4. The improvement according to claim 1 wherein said secondary beam intensity reducing means includes the combination of said dye and said inner axially extending surfaces which are selected to have at least substantially equal indices of refraction, whereby to reduce the amount of light from the secondary beam reflected off of said inner surfaces.

5. The improvement according to claim 4 wherein said inner surfaces includes a surface which forms one surface of a window through which a pump beam is intended to pass for pumping the dye within said dye cell and wherein the difference in said indexes of refractions is at most $10^{-4}$.

6. In a dye laser master oscillator for producing a primary light beam along a specific primary axis and including a dye cell through which a continuous stream of dye is caused to pass, means for directing a pump beam into said dye cell through a cooperating window in the dye cell and parallel to said specific primary axis for pumping the dye therein, and means including a beam expander, an etalon, a grating and an end mirror located outside of the dye cell on said primary axis, said grating and said end mirror located on opposite sides of the dye cell, and cooperating with the dye cell and the pumped dye passing therethrough for producing at the output of the oscillator said primary light beam along said specific primary axis, the improvement comprising an anti-reflection coating on the inner wall of said dye cell forming part of said cooperating wndow and therefore parallel to said primary axis for absorbing at least a portion of any light which is reflected off of said inner wall.

7. In a dye laser master oscillator for producing a primary light beam along a specific primary axis and including a dye cell through which a continuous stream of dye is caused to pass, means for directing a pump beam into said dye cell through a cooperating window in the dye cell and parallel to said specific primary axis for pumping the dye therein, and means including a beam expander, an etalon, a grating and an end mirror located outside of the dye cell on said primary axis, said grating and said end mirror located on opposite sides of the dye cell and cooperating with the dye cell and the pumped dye passing therethrough for producing at the output of the oscillator said primary light beam at one specific wavelength and along said specific primary axis, the improvement comprising the utilization of said dye and the material forming said cooperating window through which said pumping passes into the dye cell such that said dye and window material have substantially equal indexes of refraction whereby to minimize the possibility of light reflecting off the inner surface of said window within said dye cell.

8. In a dye laser master oscillator for producing a primary light beam along a specific primary axis and including a dye cell through which a continuous stream of dye is caused to pass, means for directing a pump beam into said dye cell through a cooperating window thereof for pumping the dye therein, and means including a beam expander, an etalon, a grating and an end mirror located outside of said dye cell on said primary axis, said grating and said end mirror located on opposite sides of the dye cell and cooperating with the dye cell and the pumped dye passing therethrough for producing at the output of the oscillator said primary light beam at one specific wavelength and along said specific primary axis, the improvement comprising providing said cooperating window into said dye cell at a location perpendicular to said primary axis and providing said pump beam so that it enters said dye cell through said cooperating window along said primary axis so as to provide a pumping zone which is spaced from the inner walls of the dye cell extending parallel to said primary axis, whereby to prevent taking of said dye from taking place at said inner walls.

9. In a method of operating a dye laser master oscillator which is designed to produce at its output a primary light beam at one specific wavelength and along a specific primary axis by passing a continuous stream of dye through a dye cell and simultaneously directing a pump beam through a window in the dye cell to intercept the continuous stream of dye, but which also produces at the oscillator's output a secondary light beam at a different wavelength and slightly off-axis with respect to said primary axis as a result of grazing incidence reflections off an inner axially extending wall within a dye cell forming part of the master oscillator, the improvement comprising the step of acting on said reflected secondary beam entirely within said dye cell for reducing the number of grazing incidence reflections, thereby reducing the intensity of said reflected secondary beam at the output of said oscillator without reducing or substantially reducing the intensity of said primary light beam.

10. The improvement according to claim 9 wherein said step of acting on said secondary beam for reducing its intensity at the output of the oscillator includes the step of coating said inner axially extending wall with a layer of anti-reflection material for absorbing at least some of the light of said secondary beam.

11. The improvement according to claim 9 wherein said step of acting on said secondary beam for reducing its intensity at the output of the oscillator includes the step of selecting said dye and said inner axially extending wall to have at least substantially equal indexes of refraction so as to reduce the amount of light from the secondary beam reflected off of said inner wall.

12. In a dye laser oscillator which is designed to produce at its output a primary light beam at one specific wavelength and along a specific primary axis by passing a continuous stream of dye through a dye cell and simultaneously directing a pump beam through a window in the dye cell to intercept the continuous stream of dye, but which also produces at the oscillator's output a secondary light beam at a different wavelength and slightly off-axis with respect to said primary axis as a result of grazing incidence reflections off the inner axially extending surfaces within a dye cell forming part of the master oscillator, the improvement comprising means entirely within said dye cell and acting on said reflected secondary beam for reducing the number of grazing incidence reflections, thereby reducing the intensity of said reflected secondary beam at the output of said oscillator without reducing or substantially reducing the intensity of said primary light beam, said oscillator including an output coupling mirror outside said dye cell and said secondary beam intensity reducing means including said mirror which is positioned within the path of said secondary beam such that a substantial portion of said secondary beam reflecting off of said coupling mirror is reflected laterally away from and to one side of said dye cell and therefore is not allowed to return to the dye cell for amplification therein.

* * * * *